US009306807B2

(12) United States Patent
Thibeault et al.

(10) Patent No.: US 9,306,807 B2
(45) Date of Patent: Apr. 5, 2016

(54) ADAPTIVE PROTOCOL/INITIALIZATION TECHNIQUE SELECTION

(75) Inventors: Brian K. Thibeault, Attleboro, MA (US); Wei-Hung Hui, Sharon, MA (US); Marc L. Morrissette, Plainville, MA (US)

(73) Assignee: Google Technology Holdings LLC, Mountain View, CA (US)

( * ) Notice: Subject to any disclaimer, the term of this patent is extended or adjusted under 35 U.S.C. 154(b) by 826 days.

(21) Appl. No.: 12/895,059

(22) Filed: Sep. 30, 2010

(65) Prior Publication Data

US 2012/0084416 A1    Apr. 5, 2012

(51) Int. Cl.
| | | |
|---|---|---|
| G06F 15/177 | (2006.01) | |
| H04L 12/24 | (2006.01) | |
| H04L 12/28 | (2006.01) | |
| H04M 11/06 | (2006.01) | |

(52) U.S. Cl.
CPC ........ *H04L 41/0886* (2013.01); *H04L 12/2801* (2013.01); *H04L 41/0806* (2013.01); *H04L 41/0846* (2013.01); *H04M 11/066* (2013.01)

(58) Field of Classification Search
CPC ............ H04L 41/0886; H04L 41/0806; H04L 12/2801; H04L 41/0846; H04M 11/066
USPC ......................................... 709/220, 222, 227
See application file for complete search history.

(56) References Cited

U.S. PATENT DOCUMENTS

| | | | | |
|---|---|---|---|---|
| 2003/0074430 A1* | 4/2003 | Gieseke et al. | ............... | 709/221 |
| 2003/0084176 A1* | 5/2003 | Tewari et al. | ................. | 709/230 |
| 2005/0096049 A1* | 5/2005 | Burch | .................... | G01D 9/005 |
| | | | | 455/436 |
| 2005/0174961 A1* | 8/2005 | Hrastar | ................. | H04W 28/20 |
| | | | | 370/328 |
| 2006/0109797 A1* | 5/2006 | Ishida et al. | .................. | 370/252 |
| 2006/0262722 A1 | 11/2006 | Chapman et al. | | |
| 2007/0038743 A1* | 2/2007 | Hellhake et al. | .............. | 709/224 |
| 2007/0177526 A1 | 8/2007 | Siripunkaw et al. | | |
| 2008/0043945 A1* | 2/2008 | Lee | ............................ | 379/93.08 |
| 2008/0268816 A1* | 10/2008 | Wormald | .............. | H04W 68/00 |
| | | | | 455/412.2 |
| 2013/0123885 A1* | 5/2013 | Zhu | ........................ | A61B 18/12 |
| | | | | 607/100 |

FOREIGN PATENT DOCUMENTS

WO     2009/146426 A1    12/2009

OTHER PUBLICATIONS

PCT Search Report & Written Opinion, RE: Application #PCT/US2011/049981; Mar. 26, 2012.

* cited by examiner

*Primary Examiner* — Brian J Gillis
*Assistant Examiner* — Michael A Keller
(74) *Attorney, Agent, or Firm* — Lerner, David, Littenberg, Krumholz & Mentlik, LLP (57) ABSTRACT

A method for selection of an initialization technique and protocol for a communications device is provided. The method includes, but is not limited to, selecting a primary initialization technique from a set list of initialization techniques, implementing the primary initialization technique to initialize and move the communications device, and determining if the communications device has been initialized and moved. If the communications device has not been initialized and moved upon implementing the primary initialization technique, an additional initialization technique is selected from the set list of initialization techniques and implemented to initialize and move the communications device.

17 Claims, 5 Drawing Sheets

| CABLE INTERFACE | IP ADDRESS | MAC ADDRESS | DS S/N | US PWR | DS PWR | Tx OFFS | MICRO REFLN | MODEM STATE | SW VERSION |
|---|---|---|---|---|---|---|---|---|---|
| 9/0/D0U1C0 | 150.31.32.13 | 0011.1a63.e1b4 | 42.5 | 45.5 | -1.6 | 3374 | 44 | ONLINE | SB5101E SB5101E-2.4.1.1-SCM14-DIAG |
| 9/0/D0U1C0 | 150.31.32.10 | 0011.1aca.2dda | 38.7 | 43.5 | -0.3 | 1288 | 29 | ONLINE | SBV5120 SBV5120-2.10.1.2-SCM20-SHPC |
| 9/0/D0U1C0 | 150.31.32.12 | 0011.aefe.8fbe | 40.1 | 45.8 | -0.1 | 3385 | 35 | ONLINE | SB5100 SB5100-1.1.1.1-SCM01-FATSH |
| 9/0/D0U1C0 | 150.31.32.11 | 0015.9a6a.88ee | 41.8 | 44.8 | -1.2 | 3379 | 31 | ONLINE | SB5101 SB5101-2.4.1.1-SCM14-DIAG |
| 9/0/D0U1C0 | 150.31.32.17 | 0015.9a6a.8906 | 40.7 | 48.0 | -5.2 | 3378 | 31 | ONLINE | SB5101 SB5101-2.4.1.1-SCM14-DIAG |
| 9/0/D0U1C0 | 150.31.32.14 | 0015.9adc.7c8c | 42.1 | 44.8 | -1.4 | 3376 | 31 | ONLINE | SB5101 SB5101-2.4.1.1-SCM14-DIAG |
| 9/0/D0U1C0 | 150.31.32.15 | 0017.ee5a.1bfc | 37.7 | 43.9 | +1.5 | 1286 | 11 | ONLINE | SB5120 SBV5120-2.19.0.8-SCM02-NOSH |
| 9/0/D0U1C0 | 150.31.32.10 | 0011.1aca.2dda | 38.7 | 43.5 | -0.3 | 1288 | 29 | ONLINE | SBV5120 SBV5120-2.10.1.2-SCM20-SHPC |
| 9/0/D0U1C0 | 150.31.32.12 | 0011.aefe.8fde | 40.1 | 45.8 | -0.1 | 3385 | 35 | ONLINE | SB5100 SB5100-1.1.1.1-SCM01-FATSH |

FIG. 3A

| VENDOR | MAC ADDRESS | I/F STATE | CONNECT SID | PRIM (dBmv) | RxPwr OFFSET | TIMING CPE | NUM | BPI |
|---|---|---|---|---|---|---|---|---|
| MOTOROLA | 0011.1a63.e1b4 | 9/0/U1 | ONLINE | 6 | 0.2 | 1275 | 0 | N |
| MOTOROLA | 0011.1aca.2dda | 9/0/U1 | ONLINE | 1 | -.4 | 1288 | 0 | N |
| MOTOROLA | 0011.aefe.8fbe | 9/0/U1 | ONLINE | 3 | 0.1 | 1786 | 0 | N |
| MOTOROLA | 0015.9a6a.88ee | 9/0/U1 | ONLINE | 2 | 0.0 | 1280 | 0 | N |
| MOTOROLA | 0015.9a6a.8906 | 9/0/U1 | ONLINE | 7 | 0.1 | 1279 | 0 | N |
| MOTOROLA | 0015.9adc.7c8c | 9/0/U1 | ONLINE | 5 | -.1 | 1277 | 0 | N |
| MOTOROLA | 0017.ee5a.1bfc | 9/0/U1 | ONLINE | 8193 | 0.3 | 1286 | 0 | N |

ADAPTIVE PROTOCOL/INITIALIZATION TECHNIQUE SELECTION

FIELD OF THE INVENTION

The present invention relates generally to methods for selection of initialization techniques and protocols for a communications device. In particular, the invention relates to methods for dynamic and adaptive selection of initialization techniques and protocols for a communications device such as a modem or any device containing a communications device.

BACKGROUND

When moving a modem from one upstream/downstream port to another upstream/downstream, the modem physically stays in the same location but retunes to a new transmit upstream frequency or locks on to a new downstream frequency. This "move" is accomplished by messages exchanging between a broadband services router (BSR) and the modem using standard protocols, such as Data Over Cable Service Interface Specification (DOCSIS) protocols. A broadband services router (BSR) may be, for example, a CMTS, edge router, or an intelligent edge router.

For example, when a BSR wants to move a modem from a first upstream port to a second upstream port, the BSR has to select an appropriate protocol. For example, for a DOCSIS 1.0 modem a UCC (Upstream Channel Change) protocol is used. A DOCSIS 1.0 modem can only move on the upstream port, and cannot be moved on the downstream port. For a DOCSIS 1.x or 2.x modem, a UCC or a DCC (Dynamic Channel Change) protocol may be used. The DCC protocol can be used for either upstream or downstream ports. For a DOCSIS 3.x modem, DCC or DBC (Dynamic Bonding Change) protocols may be used. The DBC protocol is the first and preferred method for a DOCSIS 3.x modem and can be used for either upstream or downstream ports.

In order to move a modem the BSR has to select an appropriate protocol and to exchange messages with the modem. For example, when using the DCC protocol to move a modem, if the modem is on a first upstream port, a DCC request message is sent to the modem with a new frequency, a frequency for a second upstream port, in the request message as well as an initialization technique to use.

Initialization techniques may be 0, 1, 2, 3 or 4, for example, where technique 0 is for the modem to deregister and then reregister on the other port, technique 1 is to use an initial maintenance message to move, technique 2 is to use a station maintenance to move, technique 3 can use either initial or station maintenance to move, and technique 4 just sends the new frequency and the modem just retunes to it.

After the modem receives the request, the modem will send up a response message basically saying that it received the message and will now move and retune to a new frequency and then send a correct message based on the technique used. If the modem is successfully moved, the modem will send up a messages saying it arrived on the new port is now running fine on the new port.

Moving a cable modem from one upstream/downstream port to another upstream/downstream port requires the cable modem to be initialized by using an initialization technique within a known communications protocol, such as DOCSIS, UCC (Upstream Channel Change), DCC (Dynamic Channel Change), and DBC (Dynamic Bonding Change). It is a known issue in the cable industry that not all cable modems move successfully from one upstream/downstream port to another upstream/downstream port using just any initialization technique within any of the known protocols. Some reasons for the failure to move include cable modem firmware problems, non-conformance of a specification within a set protocol, RF plant impairments, or RF network characteristic such as long delays.

There may be some existing methods for initialization of cable modems that attempt to select the proper initialization technique based on some DOCSIS rules, but these methods do not necessarily guarantee that the initialization will work properly because of some of the reasons mentioned above. Additionally, some cable modems may move in one RF plant with a particular initialization technique but need to use a different initialization technique for some other RF plant.

As a result, there is a need for a method for dynamic selection of initialization techniques for a communications device which tests various initialization techniques on a given cable modem (in its current RF plant) in real time. Additionally, there is a need for a method for adaptive selection of initialization techniques for a communications device which learns from the previous tests and determines which technique to use based on conditions, such as modem type and firmware.

SUMMARY

In one aspect, a method for selection of an initialization technique and protocol for a communications device is provided. The method includes, but is not limited to, selecting a primary initialization technique from a set list of initialization techniques, implementing the primary initialization technique to initialize the communications device, and determining if the communications device has been initialized. If the communications device has not been initialized upon implementing the primary initialization technique, an additional initialization technique is selected from the set list of initialization techniques and implemented to initialize the communications device.

In one aspect, a method for selection of an initialization technique and protocol for a current communications device is provided. The method includes, but is not limited to, querying the current communications device to obtain conditional information from the current communications device, adaptively selecting a primary initialization technique from the set list of initialization techniques based on the conditional information received from the current communications device, and implementing the primary initialization technique to initialize the current communications device.

In one aspect, a method for selection of an initialization technique and protocol for a current communications device is provided. The method includes, but is not limited to, adaptively selecting a working initialization technique from an initialization database which lists the working initialization technique for initializing a known communications device having the same or similar conditional information as the current communications device, and implementing the working initialization technique to initialize the current communications device.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that by dynamically selecting and cycling through initialization techniques and protocols from a set list of initialization techniques and protocols, in real-time, it is possible to find an initialization technique and a protocol that will allow for initialization of a wide range of communications devices, and particularly a wide range of cable modems, with a greater success rate. The present invention also makes use of the discovery that by querying a current communications device and retrieving current conditional information from the current communications device, comparing the current conditional information to predetermined conditional information in an initialization database, and finding a working initialization technique and a protocol for initializing a known communications device having the same or similar conditional information as the current communications device, it is also possible to more quickly find an initialization technique and a protocol that will allow for initialization of the current communications device.

While the present invention is initially designed to move communications devices to an upstream receiver or downstream transmitter of a CMTS (Cable Modem Termination System) device, the present invention can also be implemented for a wide range of uses such as load balancing. A CMTS device is a piece of equipment typically located in a cable company's head end or hub site, and used to provide high speed data services, such as cable internet, Voice-Over-IP (VOIP), and IP TV, to cable subscribers, or end users. The present invention can be performed on any CMTS device used for high speed internet access, or any other device that can be used to move modems.

By performing a dynamic or adaptive selection of initialization techniques and protocols, the present invention can reduce the number of failed initializations or failed moves from one upstream/downstream port to another upstream/downstream port and any resulting loss of service for an end user. Additionally, when used for load balancing, the present invention may allow for increased data throughput by the communications device since moving the communications device from one port to another port would be easier when utilization of the communications device gets high.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
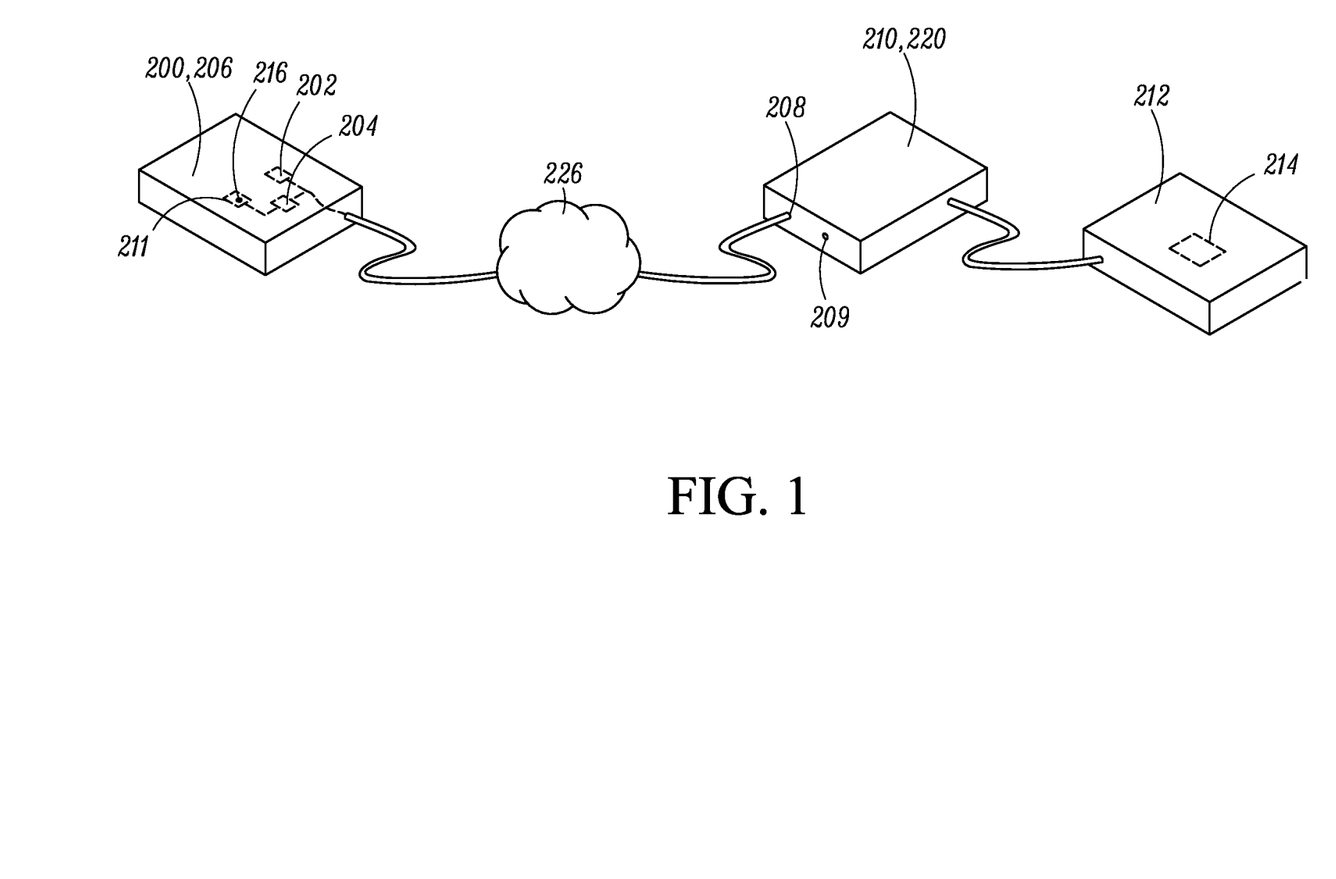
FIG. 1 depicts a schematic representation of a first communications device connected to a second communications device via a network, in accordance with one embodiment of the present invention.

With reference to FIG. 1, illustrated is an exemplary schematic representation of first communications device 200 connected to a second communications device 210 via a network 226. Network 226 may include any type of network that is capable of carrying information from first communications device 200 to second communications device 210, including information for multimedia content, images, data and streaming video.

Network 226 may include a data network, such as the Internet, an intranet, a local area network (LAN), a wide area network (WAN), a cable network, and other like systems that are capable of transmitting multimedia video, streaming video, audio and the like. Network 226 may also include a telecommunications network, such as a local telephone network, long distance telephone network, cellular telephone network, satellite communications network, cable television network and other like communications systems that interact with computer systems to enable set-top boxes or other audio/visual controllers to communicate media and multimedia signals. Network 226 may include more than one network and may include a plurality of different types of networks. Thus, network 226 may include a plurality of data networks, a plurality of telecommunications networks, cable systems, satellite systems and/or a combination of data and telecommunications networks and other like communication systems.

First communications device 200 is connected with, and in particular receiver 202 and transmitter 204 are connected with, an upstream/downstream port 208 for receiving and sending information through the network 226 to second communications device 210. Preferably first communication device 200 is a cable modem 206 which is a type of Network Bridge and modem that provides bi-directional data communication via radio frequency channels on a Cable Television (CATV) infrastructure.

First communications device 200 includes a storage device 211 which stores condition information 216. Conditional information 216 is any information provided by the first communications device 200 which can reveal the type of communication device being used or the environment in which the communications device 200 is being used. For example, information which can reveal the type of communications device being used includes information such as: a model type of the communications device 200; a name of a vendor who manufactured the communications device 200; a version name or number for software operating on the communications device 200; a name of a type of protocol used by the communications device 200 to operate, such as a DOCSIS version for the communications device 200; the type of communications device 200, such as a set top box modem or a cable modem; whether or not the communications device 200 is a multimedia terminal adapter (MTA) (an MTA is a modem that is used for VOIP); and any historic statistical usage data for the communications device 200 which can indicate compatibility with certain communications protocols, such as DCC or UCC or DBC. For example, information which can reveal the environment in which the communications device 200 is being used includes information such as RF plant impairments or RF network characteristics.

Second communications device 210 is preferably another communications device, such as an upstream receiver 220, a CMTS device, or an edge router. Preferably second communications device 210 is in communication with a storage device 212 which stores an initialization database 214. Storage device 212 includes any device capable of storing data, information, or instructions, such as: a memory chip storage including RAM, ROM, EEPROM, EPROM or any other type of flash memory device; a magnetic storage devices including a hard or floppy disk, and magnetic tape; optical storage devices such as a CD-ROM disc, a BD-ROM disc, and a BluRay™ disc; and holographic storage devices.

Figure 2A:
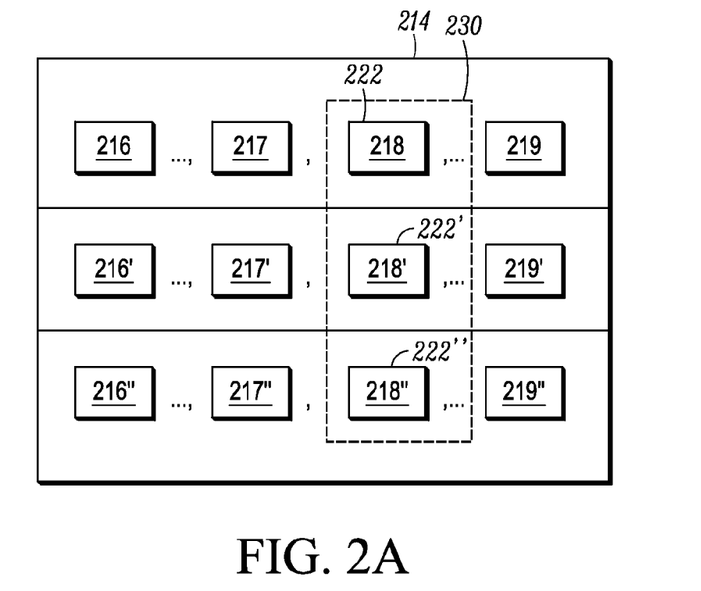
FIG. 2A depicts a block-diagram representation of an initialization database for storing information on initializations and protocols of a variety of communications devices, in accordance with one embodiment of the present invention.

With reference to FIG. 2A, illustrated is an exemplary representation of an initialization database 214 for storing information on initializations of a variety of communications devices 200. The initialization database 214 includes conditional information 216 for a particular communications device 200 along with initialization technique information 217 and protocol detailing a particular initialization technique 218 and protocol used for the particular communications device 200 having the corresponding conditional information 216. Initialization technique 218 includes any technique within any communications protocol used to initialize communication and the exchange of information between the communications device 200 and a second communications device 210.

Within each communications protocol, there may be a variety of initialization techniques 218. For example, the DOCSIS communications protocol includes five different initialization techniques:

technique 0, which causes the communications device 202 or modem to reinitialize and re-register on a new upstream/downstream port 208;

technique 1, which broadcasts initial ranging on a new channel before normal operation of the communications device 202 or modem;

technique 2, which performs unicast ranging on a new channel before normal operation of the communications device 202 or modem;

technique 3, which performs either broadcast or unicast ranging on a new channel before normal operation of the communications device 202 or modem;

technique 4, which uses a new channel directly without re-initializing or ranging the communications device 202 or modem. For initialization of the communications device 200, however, only techniques 1, 2, and 4 are relevant since technique 0 forces the communications device 200 or modem to re-register, and technique 3 just uses either technique 1 or technique 2.

The initialization database 214 also includes result information 219 indicating whether or not the particular initialization technique 218 used for the particular communications device 200 having the corresponding conditional information 216 was successful or not. Preferably, if the particular initialization technique 218 used for the particular communications device 200 having the corresponding conditional information 216 was successful, that initialization technique 218 is designated a working initialization technique 218 for any communications device 200 having the same or similar conditional information as the conditional information 216 of the particular communications device 200. In this manner, the initialization database 214 catalogues and stores information on various initialization techniques 218 for a variety of communications devices 200 and records results information 219 indicating which initialization techniques 218 work for which communications devices 200 having corresponding conditional information 216.

In one embodiment, the communications device 200 is moved from upstream/downstream port 208 and connected with another upstream/downstream port 209 which is connected with a spare upstream receiver 220. While, this embodiment of the present invention is specific for the application of moving the communications device 200 to another upstream/downstream port 209 connected with upstream receiver 220, the present invention has other uses such as for load balancing, or for moving the communications device to another downstream port connected with a downstream transmitter.

When communications device 200 has to be moved and connected with a spare upstream receiver 220 for channel quality assessments, the spare upstream receiver 220 or any other second communications device 210, such as a CMTS device, connected with the communications device 200 uses a moving technique within an appropriate protocol based on the type or model number of the communications device 200.

For example, if the communications device 200 is a series 1.1 cable modem, a DCC protocol would be selected, since a UCC protocol is used for all modems earlier than version 1.1, (UCC can also be used on 1.x and 2.x modems but DCC is preferred) a moving technique from the DCC protocol would be selected to move the communications device 200 and an initialization technique 218 from the DCC protocol would be used to try and initialize the communications device 200. If a DCC protocol is used, initialization technique 1 within the DCC protocol, which uses an initial maintenance to perform a move, is first used to initialize the communications device 200. If initialization technique 1 is successful, then it is recorded in initialization database 214 that initialization technique 1 is a working initialization technique 222 for that particular type or model of communications device 200, indicating for future users that technique 1 was used to successfully move the communications device 200. A DBC technique, which has the same initialization techniques as DCC, may be used for 3.x modems.

Figure 2B:
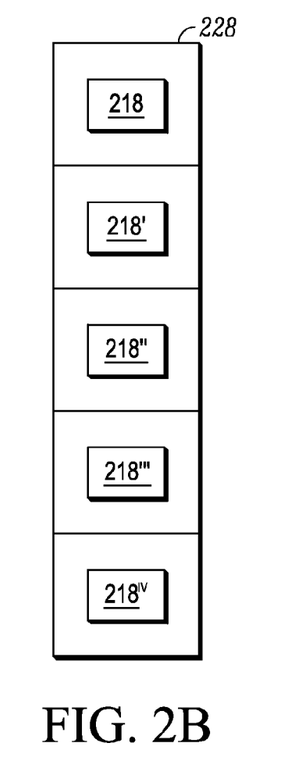
FIG. 2B depicts a block-diagram representation of a set list of initialization techniques and protocols, in accordance with one embodiment of the present invention.

If initialization technique 1 was not successful, then it is recorded in initialization database 214 that initialization technique 1 is not a working initialization technique 222 for that particular type or model of communications device 200, indicating for future users that technique 1 was not used to successfully move the communications device 200 (for current RF plant conditions). This allows us to use an initialization technique 218 which is not technique 1 when next initializing and moving a similar or same type of communications device as communications device 200. This process continues until a working initialization technique 222 is found for communications device 200 modem or until all the initialization techniques 218 with a set list 228 or 230 are cycled through and it is found that no listed initialization technique 218 will successfully move the communications device 200. If the communications device 200 cannot be moved successfully with any listed initialization technique 218, or within any initialization technique 218 for any one of the known communications protocols then the communications device 200 is placed in a "no move list" and designated as a non-movable communications device, so that in the future it is not attempted to move the communications device 200 again.

Placing the communications device 200 in a "no move list" and designating it as a non-movable communications device helps to cut down on an end user's loss of service, since an unsuccessful move may cause the communications device 200 to deregister. Preferably, the communications device is placed in the "no move list" only after all possible techniques and protocols have been exhausted.

In one embodiment, when the communications device 200 is initially installed, the communications device 200 is registered and the second communications device 210 extracts conditional information 216 from the communications device 200, such as the DOCSIS version (1.X, 2.0 or 3.0) of the communications device 200, or the type of the communications device 200 such as an MTA or set top box. A query could also be executed to extract the conditional information 216 from the communications device 200 some time after installation and before moving the communications device 200.

The second communications device 210 could then use some or all of the conditional information 216 to determine the best protocol and initialization technique 218 to use when moving and initializing the communications device 200.

Based on some initial trial and error, initialization database 214 could be dynamically created which would be queried before selecting an initialization technique 218 to move communications device 200. For example, it could be determined that certain vendors of communications devices do not handle DCC very well or that only certain initialization techniques 218 may be used when moving a communications device operating on DCC. Having this kind information in initialization database 214 before moving communications device 200, allows the second communications device 210 to more quickly determine which protocol and initialization technique 218 to use in order to move and initialize communications device 200. Since the second communications device 210 is provided with MAC address of the communications device 200, which identifies the communications device 200, the second communications device 210 could look up the applicable information in the initialization database 214.

The second communications device 210 could also use the version number, (e.g. the DOCSIS version number) of the communications device 200 when the communications device 200 registers with the second communications device 210, to determine if a certain protocol, such as DCC, is even capable of working for a certain communications device 200. If a protocol is not capable of working for a certain communications device 200, it may indicate that another protocol, such as UCC, may work.

Additionally, depending on the type of communications device communications device 200 is, for example a set top box, the second communications device 210 may decide not to attempt to move the communications device 200 at all, or the second communications device 210 may decide to use a particular initialization technique 218. For example, if the communications device 200 is an MTA, then initialization technique 4 of the DOCSIS communications protocol may be used since its known to be one of the fastest initialization techniques 218 and would have one of the least impacts on voice calls during a move.

In one embodiment, historical usage statistics that are already kept for particular communications devices may be added to the initialization database 214 to help determine the best initialization technique 218 for moving a particular communications device 200.

Figure 3A:
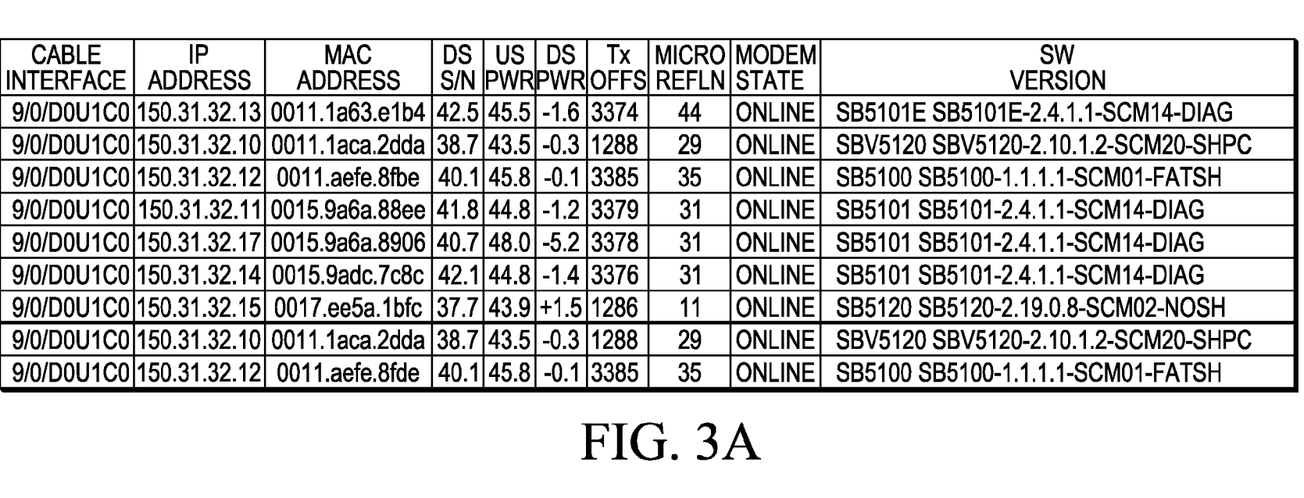
FIGS. 3A and 3B depicts tabular representations of output from commands issued by a second communications device to a first communications device, in accordance with one embodiment of the present invention.
Figure 3B:
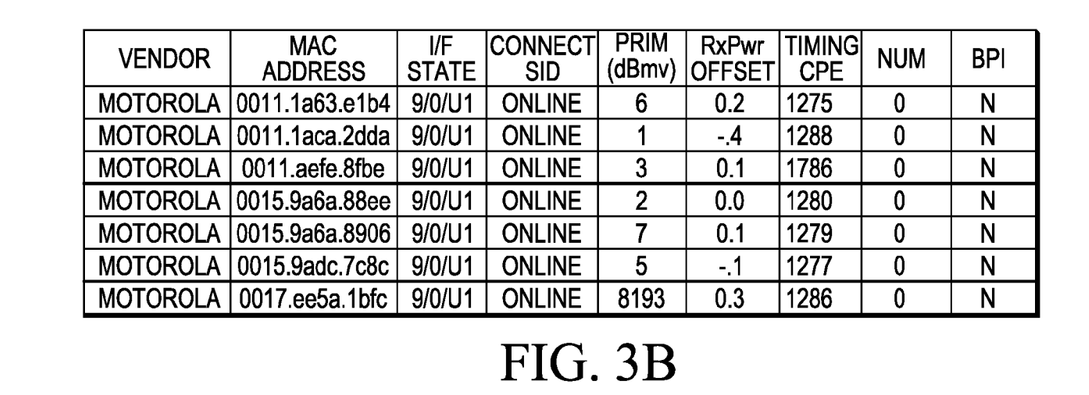

With reference to FIGS. 3A and 3B, illustrated are tabular representations of output from commands issued by a second communications device 210 to a first communications device 200 which show conditional information of the communications device 200, such as modem type, modem software version and modem vendor which could all be extracted from the communications device 200.

Figure 4:
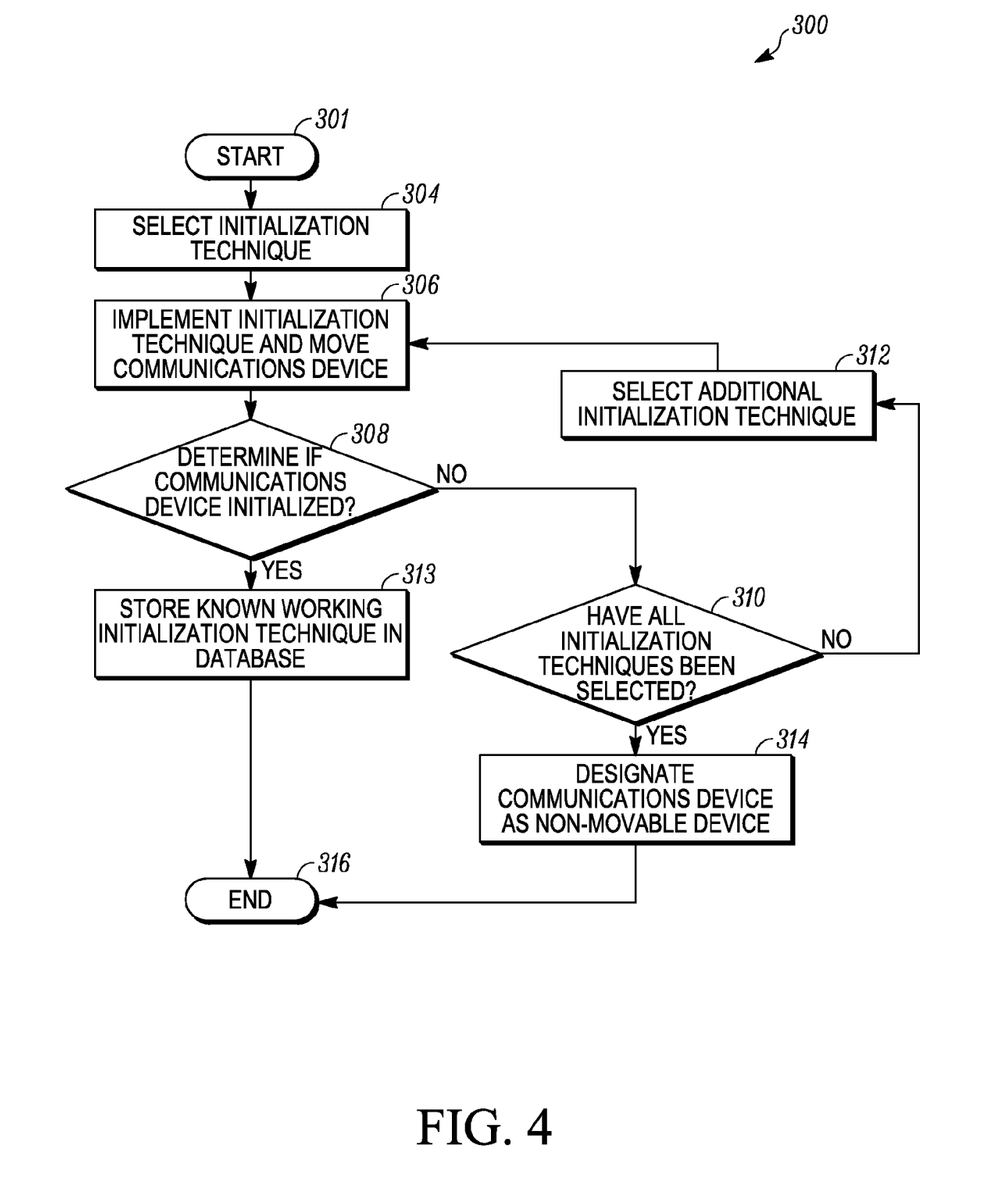
FIG. 4 depicts a flowchart illustration of methods, apparatus (systems) and computer program products, in accordance with one embodiment of the present invention.

With reference to FIG. 4, illustrated is a flowchart representation of a method 300 for selection of an initialization technique 218 for first communications device 200. At block 301, method 300 is initiated with a start operation. At block 304, second communications device 210 selects a primary or first initialization technique 218 from a set list 228 of initialization techniques 218, as shown in FIG. 2B, and then transmits the primary initialization technique 218 to the first communications device 200. The set list 228 may be stored on storage device 212. The primary initialization technique 218 may be selected at random, or may be selected using a preset algorithm or set of algorithms used to try maximize the probability that the primary initialization technique 218 will initialize the communications device 200. At block 306, the primary initialization technique 218 is received by the first communications device 200 whereupon it is implemented to initialize and move the first communications device 200. At block 308, the second communications device 210 determines if the first communications device 200 has been initialized and moved. If the first communications device 200 has not been initialized upon implementing the primary initialization technique 218, method 300 moves to block 310 and it is determined if all the initialization techniques 218 within the set list 228 of initialization techniques 218 have been selected and implemented.

If it is determined that not all the initialization techniques 218 within the set list 228 of initialization techniques 218 have been selected and implemented, then the method 300 moves to block 312, if all the initialization techniques 218 within the set list 228 of initialization techniques 218 have been selected and implemented and/or all protocols which we would like to try have been tried, then the method 300 moves to block 314. At block 314, the communications device 200 is designated a non-movable communications device, and the method 300 then moves to block 316 whereupon the method 300 ends. At block 312, an additional initialization technique 218 is selected from the set list 228 of initialization techniques 218 and implemented at block 306 to initialize the communications device 200. Additional initialization technique 218 is any initialization technique 218 selected from the set list 228 after the primary initialization technique 218 is selected. The additional initialization technique 218 may be selected at random, or may be selected using a preset algorithm or set of algorithms used to try maximize the probability that the additional initialization technique 218 will initialize the communications device 200.

Additional initialization techniques 218 are selected and implemented to initialize the communications device 200 until the communications device 200 is initialized or until all the initialization techniques 218 within the set list 228 of initialization techniques 218 are selected and implemented. If the communications device 200 has been initialized, method 300 moves from block 308 to block 313 and a known working initialization technique 222 and the protocol associated with the working initialization technique 222 are both stored in initialization database 214, then method 300 moves to block 316 and ends.

Figure 5:
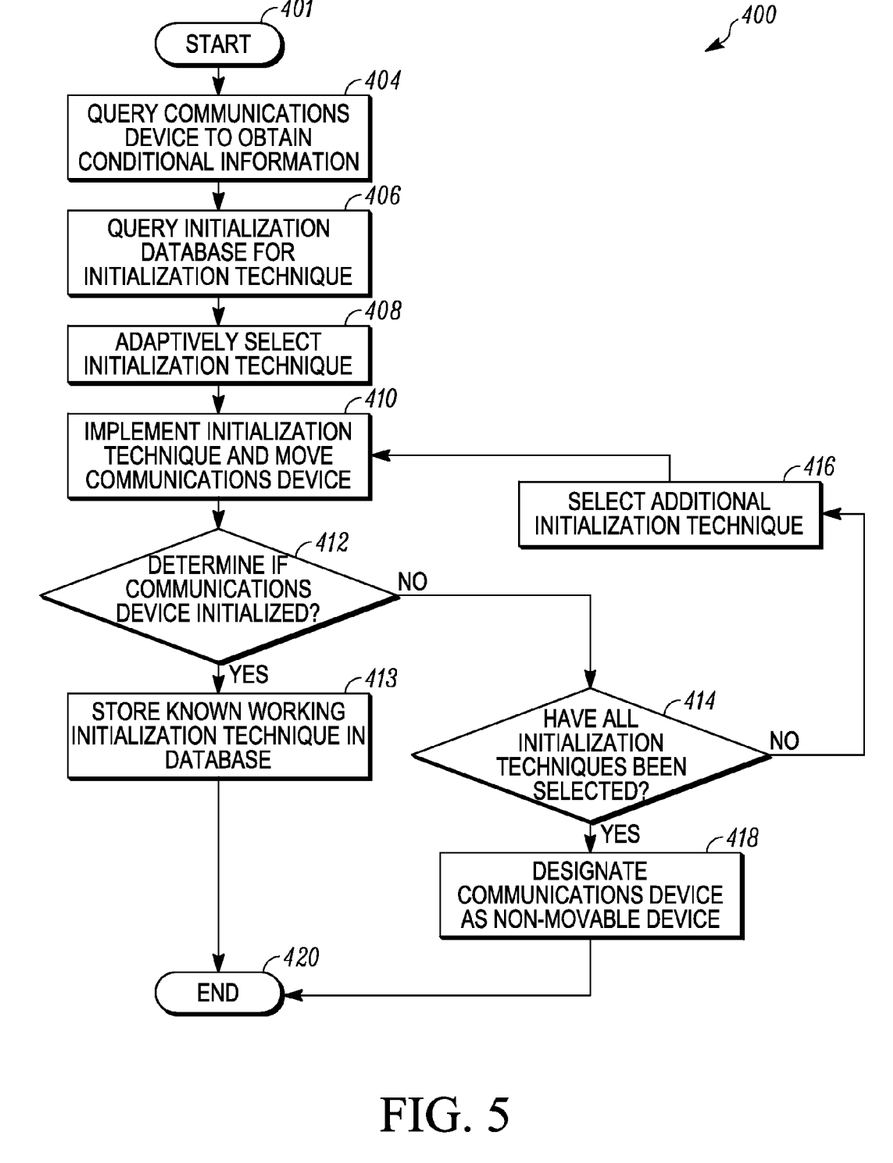
FIG. 5 depicts a flowchart illustration of methods, apparatus (systems) and computer program products, in accordance with one embodiment of the present invention.

With reference to FIG. 5, illustrated is a flowchart representation of a method 400 for selection of an initialization technique 218 for a current communications device 200. At block 401, method 400 is initiated with a start operation. At block 404, second communications device 210 queries the first and current communications device 200 to obtain current conditional information 216 from the current communications device 200. At block 406, upon receiving the current conditional information 216 from the current communications device 200, the second communications device 210 then queries an initialization database 214 for a primary initialization technique 218 from a list of working initialization techniques 222 which can initialize a communications device having the same or similar conditional information 216 as the current communications device 200. If the initialization database 214 does not exist, then the second communications device 210 develops the initialization database 214 which lists conditional information 216 received from communications device 200 along with a working initialization technique 222 which can initialize the communications device 200. Moving to block 408, upon querying the initialization database 214, the method 400, and preferably the communications device 210, adaptively selects a primary initialization technique 218 from a list 230 of working initialization techniques 222 based on the current conditional information 216 received from the current communications device 200 and then transmits the primary initialization technique 218 to the first communications device 200. At block 410, the primary initialization technique 218 is received by the current communications device 200 whereupon it is implemented to initialize and move the current communications device 200. At block 412, the second communications device 210 determines if the current communications device 200 has been initialized and moved. If the current communications device 200 has not been initialized upon implementing the primary initialization technique 218, method 400 moves to block 414 and it is determined if all the initialization techniques 218 within the list 230 of working initialization techniques 222 have been selected and implemented.

If it is determined that not all the initialization techniques 218 within the list 230 of working initialization techniques 222 have been selected and implemented, then the method 400 moves to block 416, if all the initialization techniques 218 within the list 230 of working initialization techniques 222 have been selected and implemented and/or all protocols which we would like to try have been tried, then the method 400 moves to block 418. At block 418, the communications device 200 is designated a non-movable communications device, and the method 400 then moves to block 420 whereupon the method 400 ends. At block 416, an additional initialization technique 218 is selected from the list of working initialization techniques 222 and implemented at block 410 to initialize the communications device 200. Additional initialization techniques 218 are selected and implemented to initialize the communications device 200 until the communications device 200 is initialized or until all the initialization techniques 218 within the list 230 of working initialization techniques 222 are selected and implemented. If the communications device 200 has been initialized, method 400 moves from block 412 to block 413 and a known working initialization technique 222 and the protocol associated with the working initialization technique 222 are both stored in initialization database 214, then method 400 moves to block 420 and ends.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium used to actually carry out the distribution. Examples of a computer-readable medium include, but are not limited to, the following: a recordable type medium such as a floppy disk, a hard disk drive, a Compact Disc (CD), a Digital Video Disk (DVD), a digital tape, a computer memory, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method for selection of an initialization technique corresponding to a protocol for a communications device, the method comprising:
    querying the communications device to obtain conditional information from the communications device, the conditional information comprising at least one of RF plant impairments or RF network characteristics;
    selecting, based on the conditional information obtained from the communications device, a primary initialization technique associated with a protocol from a set list of initialization techniques, the primary initialization technique being one of a plurality of initialization techniques within the protocol;
    implementing the primary initialization technique to initialize and move the communications device; and
    determining whether the communications device has been initialized and moved, when the communications device has not been initialized and moved upon implementing the primary initialization technique, select an additional initialization technique from the set list of initialization techniques and implement the additional initialization technique to initialize and move the communications device.

2. The method of claim 1, wherein additional initialization techniques are selected and implemented to initialize and move the communications device until the communications device is initialized and moved or until all the initialization techniques within the set list of initialization techniques are selected and implemented.

3. The method of claim 2, further comprising designating the communications device as a non-movable communications device upon selecting and implementing all initialization techniques from the set list of initialization techniques and upon determining that the communications device cannot be initialized and moved successfully.

4. The method of claim 1, further comprising developing an initialization database which lists the conditional information along with a working initialization technique which has initialized and moved the communications device.

5. A method for selection of an initialization technique for a current communications device, the method comprising:
    querying the current communications device to obtain conditional information from the current communications device, the conditional information comprising at least one of RF plant impairments or RF network characteristics;
    adaptively selecting a primary initialization technique associated with a protocol from a set list of initialization techniques based on the conditional information received from the current communications device, the primary initialization technique being one of a plurality of initialization techniques within the protocol; and
    implementing the primary initialization technique to initialize the current communications device.

6. The method of claim 5, further comprising determining whether the current communications device has been initialized by the primary initialization technique.

7. The method of claim 6, further comprising designating the primary initialization technique a working initialization technique when the current communications device has been initialized by the primary initialization technique.

8. The method of claim 7, further comprising developing an initialization database which lists the conditional information along with the working initialization technique which initializes the current communications device having the conditional information.

9. The method of claim 5, wherein the adaptively selecting of the primary initialization technique is from an initialization database which lists the conditional information along with a working initialization technique which can initialize a known communications device having the same or similar conditional information as the current communications device.

10. The method of claim 9, further comprising amending the initialization database based on whether or not the current communications device has been initialized by the selected initialization technique.

11. The method of claim 5, wherein the communications device is a modem.

12. A method for selection of an initialization technique for a current communications device, the method comprising:
    adaptively selecting a working initialization technique from an initialization database which lists the working initialization technique for initializing a known communications device having the same or similar conditional information as the current communications device, the conditional information comprising at least one of RF plant impairments or RF network characteristics; and
    implementing the working initialization technique to initialize the current communications device, wherein the working initialization technique is associated with a protocol and is one of a plurality of initialization techniques within the protocol.

13. The method of claim 12, further comprising determining whether the current communications device has been initialized by the working initialization technique.

14. The method of claim 13, further comprising amending the initialization database to include current conditional information for the current communications device along with the working initialization technique used to initialize the current communications device when the current communications device has been initialized by the working initialization technique.

15. The method of claim 13, wherein when the communications device has not been initialized upon implementing the primary initialization technique, an additional initialization technique is selected and implemented to initialize the communications device.

16. The method of claim 12, wherein additional initialization techniques are selected and implemented to initialize the current communications device until the current communications device is initialized or until all the initialization techniques within a set list of initialization techniques are selected and implemented.

17. The method of claim 16, further comprising designating the current communications device as a non-movable communications device upon selecting and implementing all initialization techniques from the set list of initialization techniques, and upon determining that the current communications device has not been initialized.

* * * * *